US012604102B2

(12) United States Patent
Velmurugan et al.

(10) Patent No.: US 12,604,102 B2
(45) Date of Patent: Apr. 14, 2026

(54) SYSTEM AND METHOD FOR RECOVERING CAMERA STREAMING

(71) Applicant: E-CON SYSTEMS INDIA PRIVATE LIMITED., Chennai (IN)

(72) Inventors: S Velmurugan, Chennai (IN); S Ashwanth, Chennai (IN); S Koil Arul Raj, Chennai (IN)

(73) Assignee: E-CON SYSTEMS INDIA PRIVATE LIMITED., Chennai (IN)

( * ) Notice: Subject to any disclaimer, the term of this patent is extended or adjusted under 35 U.S.C. 154(b) by 76 days.

(21) Appl. No.: 18/812,316

(22) Filed: Aug. 22, 2024

(65) Prior Publication Data

US 2026/0059202 A1      Feb. 26, 2026

(51) Int. Cl.
| | |
|---|---|
| *H04N 23/81* | (2023.01) |
| *H04N 23/66* | (2023.01) |
| *H04N 23/90* | (2023.01) |

(52) U.S. Cl.
CPC ............. *H04N 23/81* (2023.01); *H04N 23/66* (2023.01); *H04N 23/90* (2023.01)

(58) Field of Classification Search
CPC ......... H04N 23/81; H04N 23/66; H04N 23/90
See application file for complete search history.

(56) References Cited

U.S. PATENT DOCUMENTS

| | | | |
|---|---|---|---|
| 2023/0056155 A1* | 2/2023 | Fukuda | ................. G06F 16/784 |
| 2023/0199158 A1* | 6/2023 | Tsutsui | ................. H04N 21/431 |
| | | | 353/69 |
| 2024/0331660 A1* | 10/2024 | Inoue | ..................... G09G 5/377 |
| 2025/0358547 A1* | 11/2025 | Takagi | ................... H04N 25/70 |

\* cited by examiner

*Primary Examiner* — Bryce P Bonzo
*Assistant Examiner* — Xinyuan Yu
(74) *Attorney, Agent, or Firm* — Sage Patent Group

(57) ABSTRACT

The present invention describes method for recovering camera streaming during failures in streaming process of camera device. Method comprising: initializing, at camera driver probe, stream monitor array of structures, each structure in having preconfigured camera device identification details; detecting error associated with camera device; invoking error handling thread upon detecting error in streaming process; comparing camera device index associated with camera device facing detected error to unique camera index in preconfigured camera device identification details of each camera device in stream monitor array; identifying if camera device index matches with unique name index of camera device in stream monitor array to identify camera index of camera device facing detected error; and resetting camera function of camera device according to camera index in case camera device index is matched with unique name. The disclosure further relates to system for recovering camera streaming during failures in the streaming process of camera device.

20 Claims, 5 Drawing Sheets

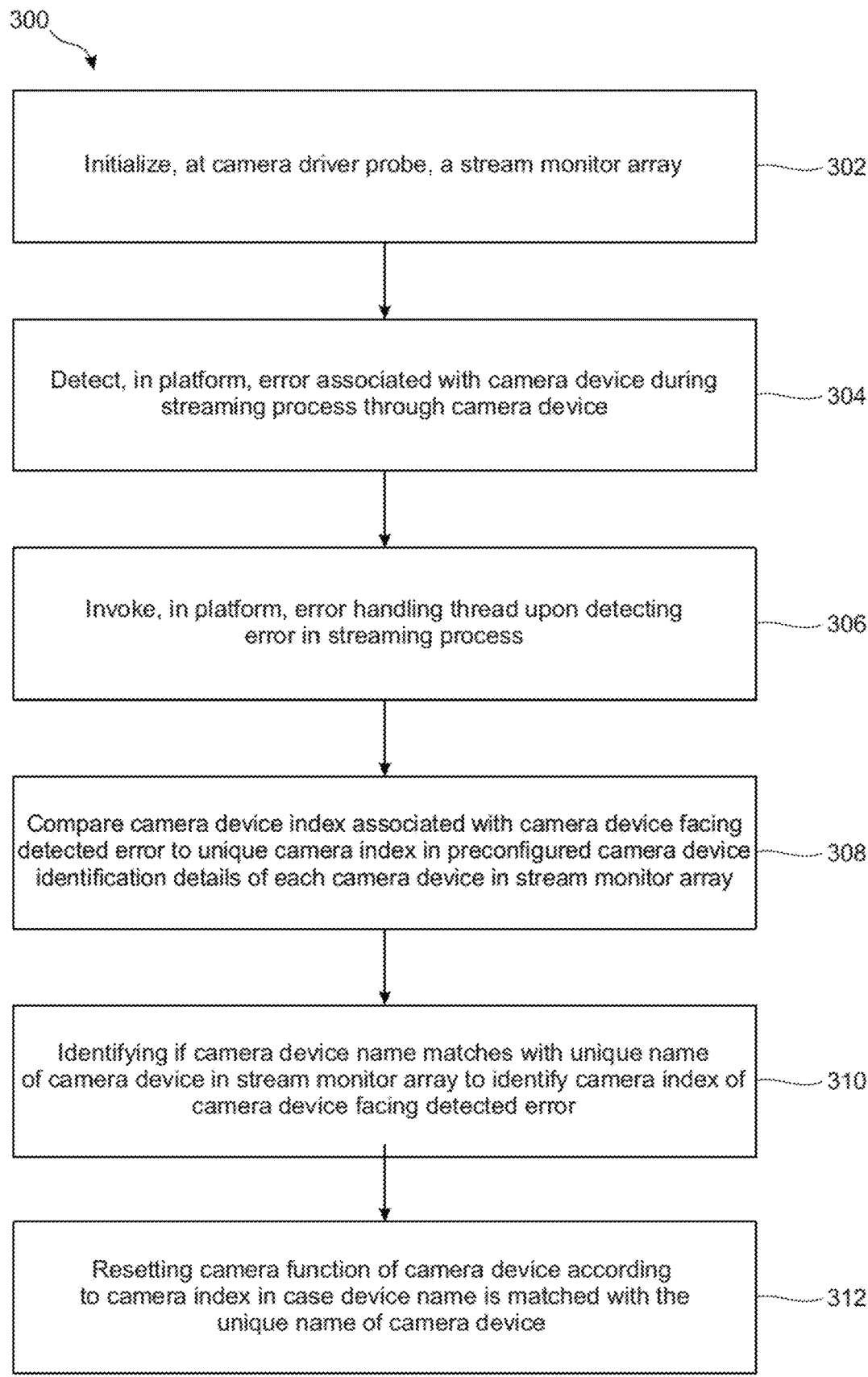

300

Initialize, at camera driver probe, a stream monitor array ——— 302

Detect, in platform, error associated with camera device during
streaming process through camera device ——— 304

Invoke, in platform, error handling thread upon detecting
error in streaming process ——— 306

Compare camera device index associated with camera device facing
detected error to unique camera index in preconfigured camera device
identification details of each camera device in stream monitor array ——— 308

Identifying if camera device name matches with unique name
of camera device in stream monitor array to identify camera index of
camera device facing detected error ——— 310

Resetting camera function of camera device according
to camera index in case device name is matched with the
unique name of camera device ——— 312

FIG. 3

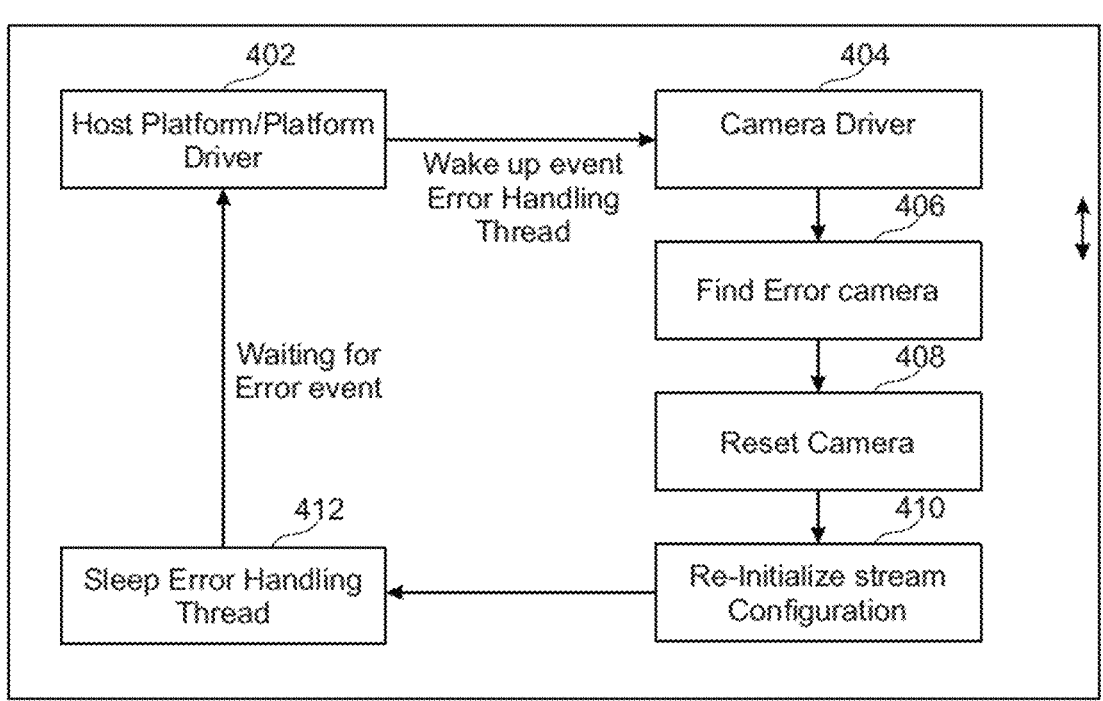
FIG. 4

SYSTEM AND METHOD FOR RECOVERING CAMERA STREAMING

FIELD OF THE INVENTION

The present disclosure relates to consumer and industrial field camera devices. More particularly, it is related to a method and system for recovering camera streaming during the streaming process of a camera device.

BACKGROUND OF THE INVENTION

The following description of related art is intended to provide background information pertaining to the field of the present disclosure. This section may include certain aspects of the art that may be related to various aspects of the present disclosure. However, it should be appreciated that this section be used only to enhance the understanding of the reader with respect to the present disclosure, and therefore, unless otherwise indicated, it should not be assumed that any of the approaches described in this section qualify as prior art merely by virtue of their inclusion in this section.

Embedded vision has transitioned from a nascent technological concept to a widely adopted technology impacting various industries like industrial automation, healthcare, retail, entertainment, and agriculture. This evolution has been accompanied by an exponential growth in available camera interfaces. Nevertheless, Mobile Industry Processor Interface (MIPI) and Universal Serial Bus (USB) interfaces continue to dominate the embedded vision landscape due to their effectiveness in a wide range of applications.

A MIPI camera is a camera module or system that uses the MIPI interface to transfer images from a camera to a host platform. In the MIPI camera, a camera sensor captures and transmits the image to a Camera Serial Interface (CSI)-2 host. This helps the sensor and embedded board to act together as a camera system to capture images. When the image is transmitted, it is placed in a memory as individual frames. Each frame is transmitted through virtual channels. Each channel is then split into lines—transmitted one at a time. Hence, it permits complete image transmission from the same image sensor, but with multiple pixel streams.

The streaming of a camera device may be stopped, due to exceeding Thermal specification, environmental disturbance like Electromagnetic Interference, host processor MIPI-CSI2 reception failure, or incorrect configuration from use. This may lead to continuous errors, such as the platform may fail to sample MIPI data and may throw kernel errors continuously. Further, due to the errors, the entire camera system may crash. Fixing such problems usually require reinstalling the driver software or rebooting of the camera system, which isn't ideal for remote systems without manual intervention.

Further, existing solutions make use of error recovery code routines to reset platform channels of the camera system at a certain interval time. However, the existing solutions are not efficient to sample MIPI signals received from the MIPI camera in case of any recoverable failure.

SUMMARY OF THE INVENTION

Detecting errors and recovering camera streaming during failures in the streaming process of a camera device is important for ensuring the accuracy and reliability of transmitted images and videos. Error detection and on-time recovery help in the stable operation of the streaming process.

The present invention is helpful in detecting errors in a camera device and recovering the camera streaming during failures in the streaming process of the camera device. The present invention provides a mechanism to detect errors and automatically restart the camera device, ensuring continuous and stable operation without human intervention.

It is an object of the present disclosure to mitigate, alleviate or eliminate one or more of the above-identified deficiencies and disadvantages in the prior art and solve at least the above-mentioned problem.

According to a first aspect, there is provided a method of recovering camera streaming during failures in the streaming process of a camera device. The method comprising: initializing, at a camera driver probe, a stream monitor array of one or more structures, wherein each structure in the stream monitor array is having a preconfigured camera device identification details. The method further comprising detecting, in a platform, an error associated with the camera device during the streaming process through the camera device. The method further comprising invoking, in the platform, an error handling thread upon detecting the error in the streaming process through the camera device. The method further comprising comparing a camera device index associated with the camera device facing the detected error to a unique camera index in the preconfigured camera device identification details of each camera device in the stream monitor array of the one or more structures. The method further comprising identifying if the camera device index matches with the unique name index of at least one camera device in the stream monitor array of the one or more structures to identify a camera index of the camera device facing the detected error. The method further comprising resetting a camera function of the camera device according to the camera index in case the camera device index is matched with the unique name of the at least one camera device.

Advantageously, the proposed system helps to find the errors and reinitializes the camera for continuous stable operation. Further, the present embodiments help to reinitialize the camera module additionally to make the platform start sampling the data properly again. The present embodiments can be used in systems where manual intervention or monitoring of the camera streaming is not possible. This helps to reset the camera streaming in case of failure during streaming automatically from camera drivers.

In some embodiments, the camera device comprises a mobile industry processor interface camera device.

In some embodiments, the preconfigured camera device identification details comprise the unique camera index, a camera handle and sensor structure the method comprises camera sensor device handle, wherein the unique camera index is assigned according to a camera device tree entry and i2c bus address for the camera device.

In some embodiments, the method comprises: initialising the error handling thread with the stream monitor array of one or more structures, wherein the initialization is a one-time initialization before invoking the error handling thread based on the detection of the error.

In some embodiments, the invoking the error handling thread comprises: assigning a global variable to store the camera device index facing the error; tracking, through a counter, a number of errors identified for the camera device, wherein a counter value for the counter is incremented in case of identification of each subsequent error, wherein the counter value is incremented till the counter value reaches a maximum permissible threshold value, wherein the number of errors comprise non-correctable errors; storing the camera device index into the global variable; setting a wait queue condition for handling the detected errors to 1; and invoking the error handling thread when the number of errors reaches the maximum permissible threshold value, wherein the counter value is reset to 0 after the invoking of the error handling thread.

In some embodiments, the wait queue condition comprises an active wait queue condition when value of the wait queue condition is set to 1 and wherein the wait queue condition comprises an inactive wait queue condition when value of the wait queue condition is set to 0.

In some embodiments, the invoking the error handling thread comprises: identifying a camera device index of the camera device facing the error, wherein the camera device index is identified using the stream monitor array of structures; determining whether to increment the counter for the identified camera device index; defining the maximum permissible threshold value for the total number of errors for all camera device index facing the detected error; and invoking the error handling thread when the number of errors reaches the maximum permissible threshold value.

In some embodiments, the resetting the camera function comprises: resetting an image signal processor block or sensor blocks of the camera device, wherein the resetting ISP block comprises: reinitializing at least one of controls and resolution of streaming data with a previously configured streamed resolution and controls of previously streamed data, wherein the resetting the ISP block recovers the camera streaming during failures.

In some embodiments, the error handling thread switches to a sleep mode, on successful completion of the resetting of the camera function or wherein the error handling thread switches to an invoke state from the sleep state when the total number of errors reaches the maximum permissible value.

In some embodiments, the method comprises: communicating, through the error handling thread to the platform, a cause of the error resulting in streaming failure of the camera device, if the streaming failure is not successfully recovered.

In some embodiments, the method comprises: recovering the camera streaming during failures based on the resetting the camera function with the i2c client handle and sensor structure handle to reinitialize the camera device.

According to a second aspect there is provided a system for recovering camera streaming during failures in the streaming process of a camera device. The system comprising: a processor; a memory storing instructions executable by the processor; a camera interface; a camera driver probe operable on the processor to initialize a stream monitor array of one or more structures. Each structure in the stream monitor array is having preconfigured camera device identification details. A platform operable on the processor, the platform configured to: detect an error associated with the camera device during the streaming process through the camera device; invoke an error handling thread upon detecting the error in the streaming process through the camera device. The platform is further configured to compare a camera device index associated with the camera device facing the detected error to a unique camera index in the preconfigured camera device identification details of each camera in the stream monitor array of the one or more structures. The platform is further configured to identify if the camera device index matches with the unique name of at least one camera device in the stream monitor array of the one or more structures to identify a camera index of the camera device facing the detected error; and reset a camera function of the camera device according to the camera index in case the device index is matched with the unique name of at least one camera device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF ACCOMPANYING DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 3 illustrates a flowchart illustrating example method steps of a method 300 performed by the system 200 for recovering the camera streaming during failures in the streaming process of a camera device, according to some embodiments of the invention;

FIG. 4 illustrates an exemplary flowchart 400 illustrating example method steps performed by the system 200, according to some embodiments of the invention.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The present invention provides a method and system for recovering camera streaming during failures in streaming process of a camera device. To address the issue as discussed in the background, an automatic camera recovery mechanism is adopted. This mechanism will detect errors and automatically restart the camera, ensuring continuous and stable operation without needing human intervention.

Figure 1:
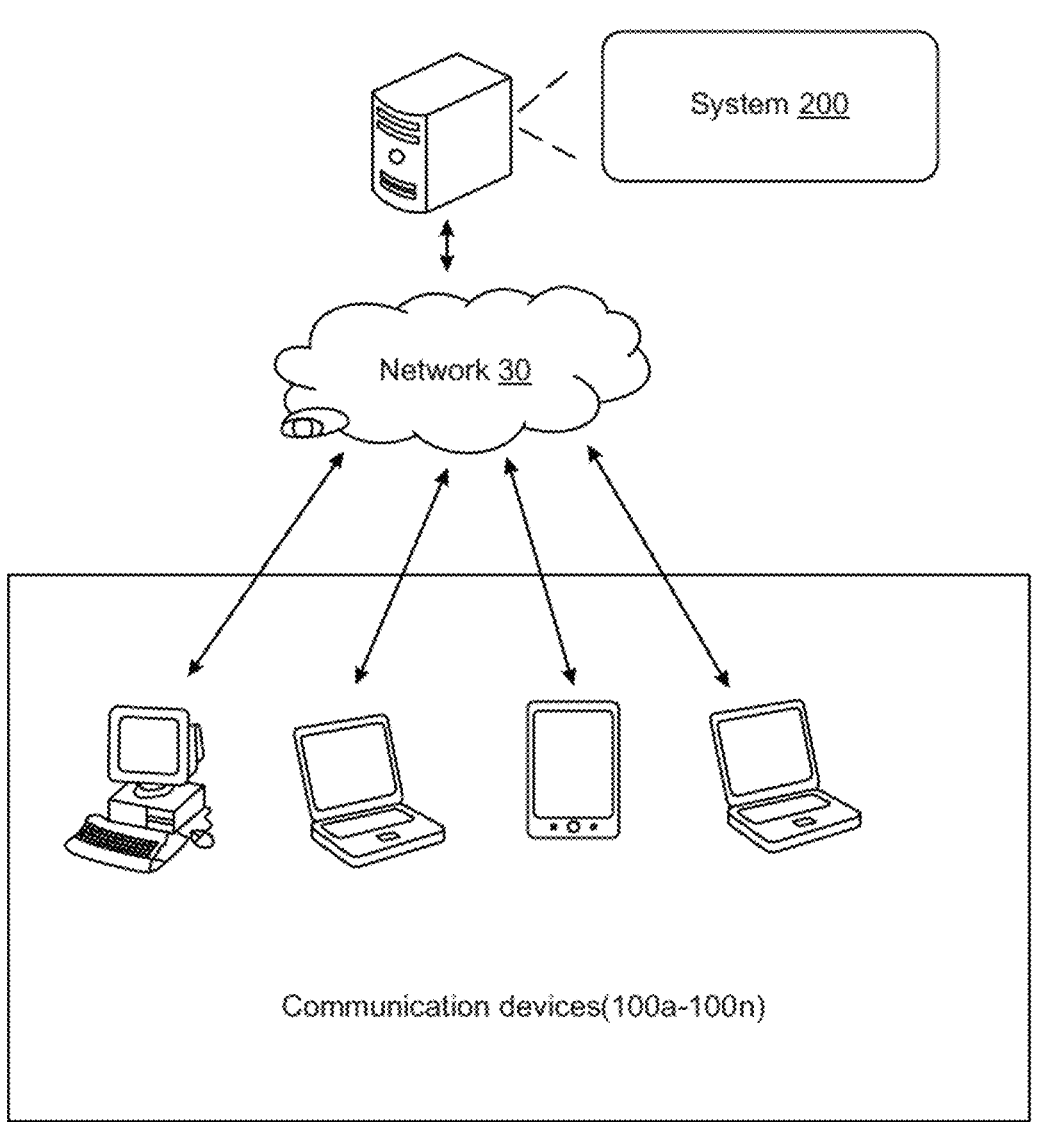
FIG. 1 illustrates a network implementation of a device 100 in a network communication, according to some embodiments of the invention.

FIG. 1 discloses a network implementation of a system 200 and a plurality of communication devices (100a-100n)

configured to communicate with each other via a network 30. A server is connected to the system 200. The server may be further connected to the plurality of communication devices (100a-100n) through the network 30.

It should be understood that the server, the system 200, and the plurality of communication devices (100a-100n) correspond to computing devices. It may be understood that the server may also be implemented in a variety of computing systems such as, a laptop computer, a desktop computer, a notebook, a workstation, a mainframe computer, a network server, a cloud-based computing environment, or a smart phone, and the like. It may be understood that the system may correspond to a variety of portable computing devices such as, a laptop computer, a desktop computer, a notebook, a smartphone, a tablet, a phablet, a camera device and the like.

In an example implementation, the network 30 may be a wireless network, a wired network, or a combination thereof. The network 30 can be implemented as one of the different types of networks, such as intranet, Local Area Network, LAN, Wireless Personal Area Network, WPAN, Wireless Local Area Network, WLAN, wide area network, WAN, the Internet, and the like. The network 200 may either be a dedicated network or a shared network. The shared network represents an association of the different types of networks that use a variety of protocols, for example, MQ Telemetry Transport, MQTT, Extensible Messaging and Presence Protocol, XMPP, Hypertext Transfer Protocol, HTTP, Transmission Control Protocol/Internet Protocol, TCP/IP, Wireless Application Protocol, WAP, and the like, to communicate with one another. Further, the communication network 30 may include a variety of network devices, including routers, bridges, servers, computing devices, storage devices, and the like.

In accordance with the embodiments disclosed herein, the server is configured for establishing the communication between the system 200 and the plurality of communication devices 100a-100n. For example, the server is configured for receiving feedback data from a plurality of sources from one or more users through the device 100 and transmit feedback analysis output to the system 200 via the network 30.

Figure 2:
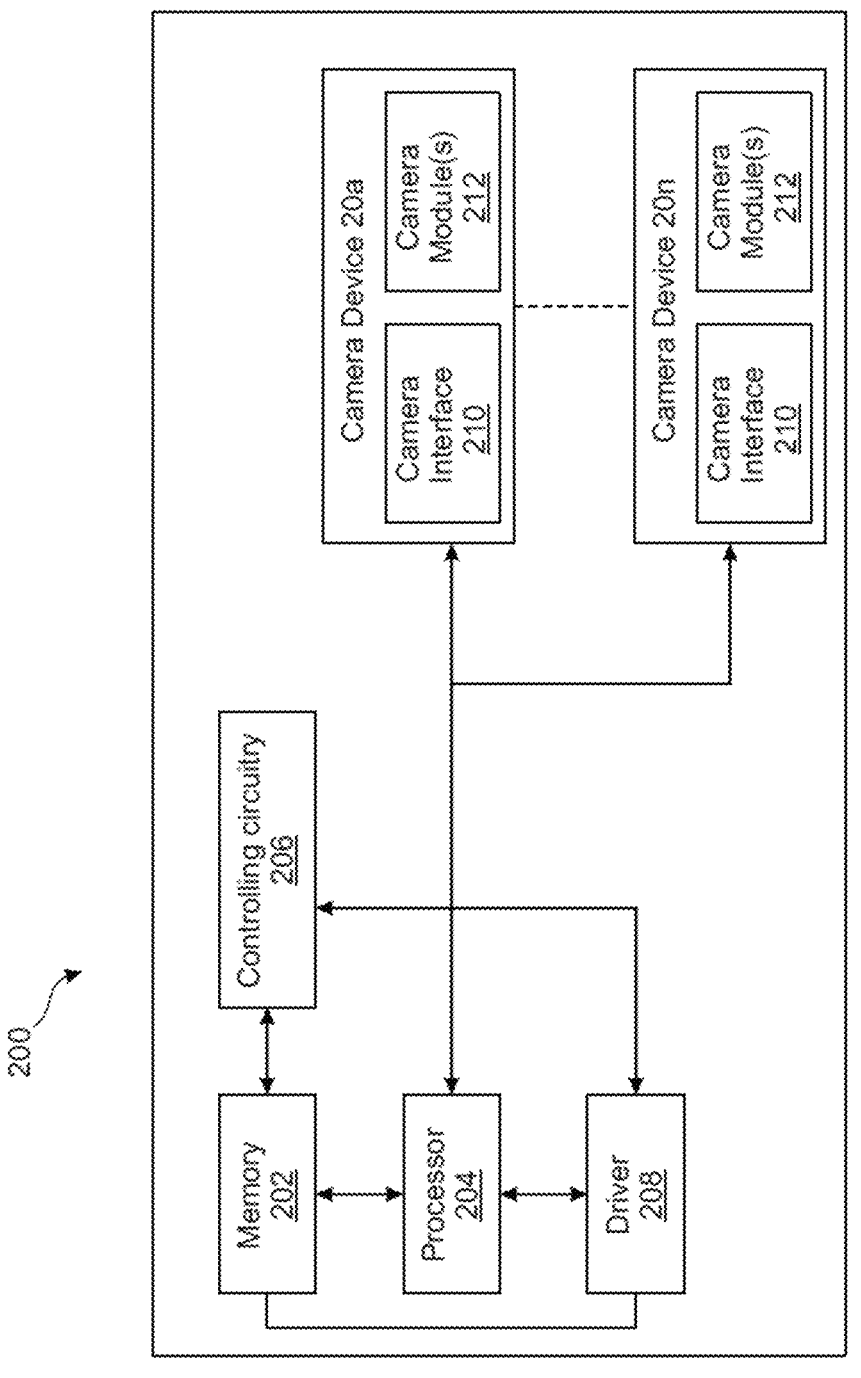
FIG. 2 illustrates a block diagram of a system 200 for recovering camera streaming during failures in streaming process of a camera device, according to some embodiments of the invention.

FIG. 2 is an example schematic diagram showing the system 200. The system 200 is configured to cause performance of the method 300 (as depicted in FIG. 3 later) for recovering camera streaming during failures in the streaming process of a camera device. The system may comprise a plurality of camera devices (20a-20n) (hereinafter referred to as camera device 20). The camera device 20 comprises a Mobile Industry Processor Interface (MIPI) camera device.

According to at least some embodiments of the present invention, the system 200 in FIG. 2 comprises one or more modules. The one or more modules may comprise a memory 202, a processor 204, a controlling circuitry 206, a driver 208 and the camera device 20. The controlling circuitry 206 may be adapted to control the other modules. The memory 202, the processor 204, and the driver 208 as well as the processor 206 may be operatively connected to each other.

The memory 202 is arranged to store a plurality of instructions to be executed by the processor 204. The memory 110 may include any computer-readable medium or computer program product known in the art including, for example, volatile memory, such as Static Random-Access Memory, SRAM, and Dynamic Random-Access Memory, DRAM, and/or non-volatile memory, such as Read Only Memory, ROM, Erasable Programmable ROM, EPROM, Electrically Erasable and Programmable ROM, EEPROM, flash memories, hard disks, optical disks, and magnetic tapes. The processor 204 is configured to execute the plurality of modules.

The controlling circuitry 206 may be adapted to control the steps as executed by the processor 204.

The driver 208 may include a camera driver probe operable on the processor 204 to initialize a stream monitor array of one or more structures. Each structure in the stream monitor array is having preconfigured camera device identification details. The preconfigured camera device identification details comprises the unique camera index, a camera handle (i2c handle) and sensor structure comprising camera sensor device handle. The unique camera index is assigned according to a camera device tree entry and i2c bus address for the camera device 20. The camera index is a unique number of a camera device. Thus, the stream monitor array can be recovered using the camera index without affecting other camera streams. A device tree entry typically includes properties of a hardware such as, configuration strings, addresses, and interrupts details.

The driver 208 may also include a platform driver (hereafter referred to as platform) operable on the processor. The platform is configured to detect an error associated with the camera device 20 during the streaming process through the camera device 20. Upon detecting the error in the streaming process through the camera device 20, the platform invoke an error handling thread. The platform compares the camera device index associated with the camera device 20 facing the detected error to a unique camera index in the preconfigured camera device identification details of each camera in the stream monitor array of the one or more structures. The platform is further configured to identify if the camera device index matches with a unique name of at least one camera device 20 in the stream monitor array of the one or more structures to identify the camera index of the camera device 20 facing the detected error. The platform is further configured to reset a camera function of the camera device 20 according to the camera index in case the device index is matched with the unique name of at least one camera device 20.

The platform is further configured to initialize the error handling thread with the stream monitor array of one or more structures. The initialization is a one-time initialization before invoking the error handling thread based on the detection of the error.

Further, the platform is configured to invoke the error handling thread by assigning a global variable to store the camera device index facing the error. The number of errors identified for the camera device 20 are tracked through a counter. A counter value for the counter is incremented in case of identification of each subsequent error of the number of errors. The counter value is incremented till the counter value reaches a maximum permissible threshold value. In an example, the number of errors comprises non-correctable errors. In an example, the non-correctable error comprises frames that are not received or corrupted frames received from the camera device 20. The camera device 20 index is stored into the global variable. A wait queue condition is set for handling the detected errors to 1. The error handling thread is invoked when the number of errors reaches the maximum permissible threshold value. The counter value is reset to 0 after the invoking of the error handling thread. The wait-queue condition comprises an active wait queue condition and an inactive wait queue condition. The wait queue condition comprises the active wait queue condition when the value of the wait queue condition is set to 1. Further, the wait queue condition comprises the inactive wait queue condition when the value of the wait queue condition is set to 0.

The platform is further configured to invoke the error handling thread by identifying the camera device index of the camera device 20 facing the error. The camera index is identified using the stream monitor array of structures. The platform determines whether to increment the counter for the identified camera device index. The maximum permissible threshold value is determined for the total number of errors for all camera device index facing the detected error. The error handling thread is invoked when the number of errors reaches the maximum permissible threshold value.

The reset of the camera function is performed by resetting an image signal processor (ISP) block or sensor blocks of the camera device 20. In an example, the resetting of the ISP block may comprise reinitializing at least one of controls and resolution of streaming data with a previously configured streamed resolution and controls of previously streamed data. The resetting of the ISP block recovers the camera streaming during failures.

In an embodiment, the error handling thread switches to a sleep mode, on successful completion of the resetting of the camera function. The error handling thread switches to an invoke state from the sleep state when the total number of errors reaches the maximum permissible value.

In an embodiment, the error handling thread may communicate to the platform, the cause of the error resulting in streaming failure of the camera device 20, if the streaming failure is not successfully recovered. In an example, in case of camera hardware failure or failure in host processor MIPI reception, the streaming failure may not be recovered successfully and hence the camera hardware failure or failure in host processor MIPI reception may be communicated as the cause of the error resulting in streaming failure of the camera device 20.

In an embodiment, the platform is further configured to recover the camera streaming during failures based on resetting of the camera function with the i2c client handle and sensor structure handle to reinitialize the camera device.

The camera device 20 may comprise the camera interface 210 and one or more camera modules 212. The one or more camera modules may comprise one or more MIPI camera modules and can be easily integrated with a wide variety of embedded platforms.

The camera interface 210 may interface with different image sensor interfaces and may provide a standard output that can be used for subsequent image processing. The camera interface 210 may facilitate connection and communication between the camera device 20 and one or more devices (the plurality of communication devices (100a-100n) as shown in FIG. 1), such as a computer, smartphone, or embedded system. The camera interface 104 may facilitate multiple communications within a wide variety of networks and protocol types, including wired networks, for example, LAN, cable, etc., and wireless networks, such as WLAN, cellular, or satellite to establish the communication between the system 300 and the plurality of communication devices (100a-100n).

In existing art, the platform drivers fail to sample the MIPI data after a long duration of continuous operation and throw kernel errors continuously. This requires either reinstallation of the driver module or rebooting of the complete system. Both become unacceptable options for the systems working in remote conditions without any human intervention. The proposed system 200 helps to find the errors and re-initialize the camera for continuous stable operation.

Further, the current embodiments help to reinitialize the camera module additionally to make the platform start sampling the data properly again. The present embodiments can be used in systems where manual intervention or monitoring of the camera streaming is not possible. This helps to reset the camera streaming in case of failure during streaming automatically from camera drivers.

FIG. 3 represents a flowchart illustrating example method steps of a method 300 executed through the system 200.

The order in which the steps of the method 300 is described is not intended to be construed as a limitation, and any number of the described method steps may be combined in any order to implement the method 300 or alternate methods. Additionally, individual steps may be deleted from the method 300 without departing from the scope of the invention as defined in the claims.

At step 302, the method 300 comprises initializing, at the camera driver probe, the stream monitor array of the one or more structures. In an example, each structure in the stream monitor array is having the preconfigured camera device identification details.

At step 304, the method 300 comprises detecting, in the platform, the error associated with the camera device during the streaming process through the camera device.

At step 306, the method 300 comprises invoking, in the platform, the error handling thread upon detecting the error in the streaming process through the camera device.

At step 308, the method 300 comprises comparing the camera device index associated with the camera device facing the detected error to the unique camera index in the preconfigured camera device identification details of each camera device in the stream monitor array of the one or more structures.

At step 310, the method 300 comprises identifying if the camera device index matches with the unique name index of the at least one camera device in the stream monitor array of the one or more structures to identify the camera index of the camera device facing the detected error.

At step 312, the method 300 comprises resetting the camera function of the camera device according to the camera index in case the camera device index is matched with the unique name of the at least one camera device.

The additional details of the method 300 are similar to the details of the system 200 and hence are not repeated for the sake of brevity.

In existing art, the platform drivers fail to sample the MIPI data after a long duration of continuous operation and throw kernel errors continuously. This requires either reinstallation of the driver module or rebooting of the complete system. Both become unacceptable options for the systems working in remote conditions without any human intervention. The proposed method 300 is automatic and helps to find the errors and re-initialize the camera for continuous stable operation. Further, the current embodiments help to reinitialize the camera module additionally to make the platform start sampling the data properly again.

FIG. 4 represents an exemplary flowchart 400 illustrating example method steps performed by the system 200. The steps as illustrated in the flowchart 400 are alternate exemplary steps performed by the system 200 and the method 300.

At Step 402, the platform (also referred to as host platform or platform driver) sends a wake up event to the camera driver probe (also may referred to as camera driver). A kernel wait queue may be initialized to help the error handling thread to act based on the event. A structure with preconfigured camera device identification details such as camera name, i2c handle and sensor structure is defined. In an example, the platform driver assigns the unique name based on the device tree entry and i2c bus address. Thus, for every camera driver probe instance, the name is assigned based on the i2c client device node name (client→dev.of_node→name). The i2c client handle and camera sensor device handle is assigned for each driver probe instance.

At step 404, the stream monitor array of one or more structures is initialized at the camera driver probe. The camera driver initialized with the stream monitor thread. The stream monitor thread contains the stream monitor array of one or more structure as it's input. Each structure in the stream monitor array of structure has the preconfigured camera device identification details. The preconfigured camera device identification details comprise the unique camera index, the camera handle (i2c handle) of all connected camera devices and unique name of each camera device in the stream monitor array of structure.

The error handling thread is initialized with the stream monitor array of one or more structures (array of stream_mon structure) as its argument. The initialization is performed only once for the entire setup. Once the initialization of the error handling thread is completed, the error handling thread function is invoked and waits for the error event from the platform using a wait_event_interruptible kernel event monitor function.

In an embodiment, the global variable is assigned to hold the camera device name which is facing error. The counter is declared to keep track of number of errors and wait queue condition variable. The counter variable is incremented whenever the uncorrectable errors occur in the platform driver until the maximum permissible error threshold is reached. In an example, the maximum permissible error threshold may be 5 but not limited to 5. Once the error threshold is reached, the camera names are copied to the global camera device name variable. Then, the wait queue condition variable is set to 1. The error handling thread is waked up using wake_up_interruptible kernel event handler function and the error counter variable is reinitialized to 0.

At step 406, on receiving the error (uncorr_err) for the maximum permissible error threshold limit, the stream monitor thread wakes up event is triggered with the camera name responsible for the error. The error handling thread first ensures whether the wait queue condition variable is set, and thread stop is not called. Then the error handling thread finds the index of the camera facing issue by comparing the camera device name updated in the global variable and the names preconfigured in the stream_mon array.

Finally, the reset function (ar0521_reset_cam function) is called with the i2c client handle and the sensor structure handle to reinitialize the camera at step 408. The reset function is called which in turn reinitializes the camera device at step 410 and then reconfigures the previous stream resolution to resume the stream. The reset function is the core function responsible for the reinitialization of the camera device. In the reset function, the ISP of the camera is restarted. Then controls and resolution during the stream failure are reconfigured to the old state to resume the camera operation.

On successful completion of resetting and reconfiguration of the camera device, the stream monitor thread moves to the sleep state again by setting the wait queue condition variable to 0 or false at step 412. The stream monitor thread remains in sleep and waits for the next error event.

In an example, the method 300 of recovering is supported and integrated across different camera platforms.

In an example, the present embodiments can be implemented in various applications such as applications where remote monitoring is used, and less manual intervention needed and applications where continuous operation of the camera needed.

The current implementation helps to reinitialize camera module additionally to make the platform start sampling the data properly again.

Figure 5:
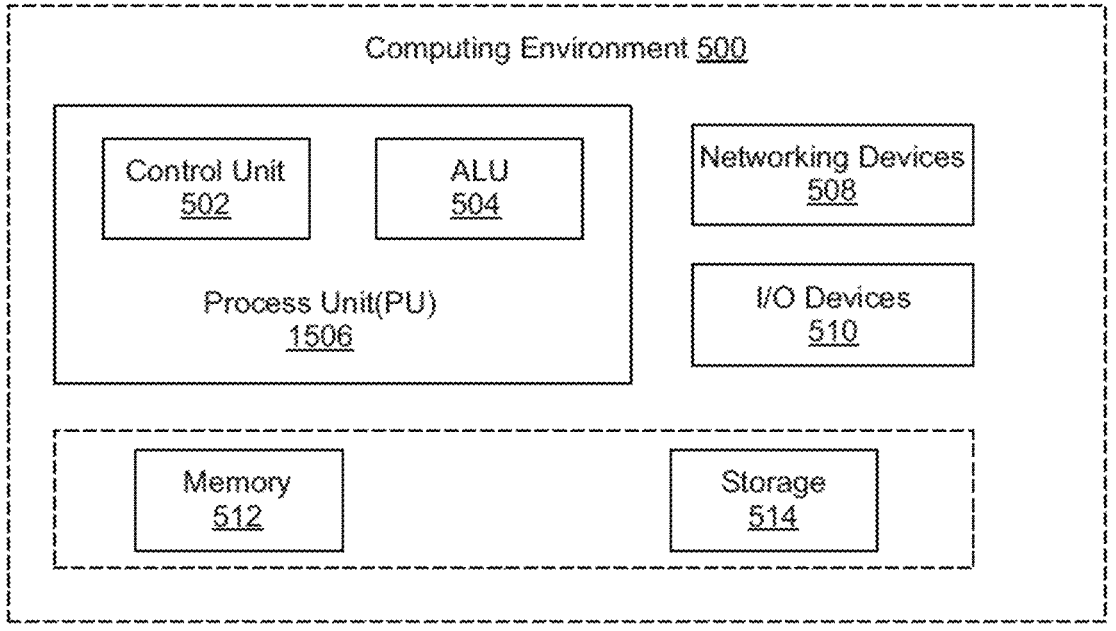
FIG. 5 discloses an example computing environment, according to some embodiments of the invention.

FIG. 5 illustrates an example computing environment 500 implementing the system 200, and method 300 as shown in FIGS. 2 and 3 for recovering camera streaming during failures in the streaming process of the camera device. As depicted in FIG. 5, the computing environment 500 comprises at least one data processing unit 506 that is equipped with a control module 502 and an Arithmetic Logic Unit, ALU 504, a plurality of networking devices 508 and a plurality Input output, I/O devices 510, a memory 512, a storage 514. The data processing module 506 may be responsible for implementing the system 200, and the method 300 as shown in FIGS. 2 and 3 respectively. For example, the data processing unit 506 in some embodiments be equivalent to the controlling circuitry of the platform described above in conjunction with FIGS. 2 and 3. The data processing unit 506 is capable of executing software instructions stored in memory 512. The data processing unit 506 receives commands from the control module 502 in order to perform its processing. Further, any logical and arithmetic operations involved in the execution of the instructions are computed with the help of the ALU 504.

The computer program is loadable into the data processing unit 506, which may, for example, be comprised in an electronic apparatus (such as the platform). When loaded into the data processing unit 506, the computer program may be stored in the memory 512 associated with or comprised in the data processing unit 506. According to some embodiments, the computer program may, when loaded into and run by the data processing module 506, cause execution of method steps according to, for example, any of the methods illustrated in FIGS. 2 and 3, or otherwise described herein.

The overall computing environment 500 may be composed of multiple homogeneous and/or heterogeneous cores, multiple CPUs of different kinds, special media and other accelerators. Further, the plurality of data processing unit 506 may be located on a single chip or over multiple chips.

The algorithm comprises instructions and codes required for the implementation are stored in either the memory 512 or the storage 514 or both. At the time of execution, the instructions may be fetched from the corresponding memory 512 and/or storage 514, and executed by the data processing unit 506.

In case of any hardware implementations various networking devices 508 or external I/O devices 510 may be connected to the computing environment to support the implementation through the networking devices 508 and the I/O devices 510.

The embodiments disclosed herein can be implemented through at least one software program running on at least one hardware device and performing network management functions to control the elements. The elements shown in FIG. 5 include blocks which can be at least one of a hardware device, or a combination of hardware device and software module.

Although the present invention has been described in considerable detail with reference to certain preferred embodiments and examples thereof, other embodiments and equivalents are possible. Even though numerous characteristics and advantages of the present invention have been set forth in the foregoing description, together with functional and procedural details, the disclosure is illustrative only, and changes may be made in detail, especially in terms of the procedural steps within the principles of the invention to the full extent indicated by the broad general meaning of the terms. Thus, various modifications are possible of the presently disclosed system and process without deviating from the intended scope of the present invention.

What is claimed is:

1. A method of recovering camera streaming during failures in streaming process of a camera device, the method comprising:

initializing, at a camera driver probe, a stream monitor array of one or more structures, wherein each structure in the stream monitor array is having a preconfigured camera device identification details;

detecting, in a platform, an error associated with the camera device during the streaming process through the camera device;

invoking, in the platform, an error handling thread upon detecting the error in the streaming process through the camera device;

comparing a camera device index associated with the camera device facing the detected error to a unique camera index in the preconfigured camera device identification details of each camera device in the stream monitor array of the one or more structures;

identifying if the camera device index matches with the unique name index of at least one camera device in the stream monitor array of the one or more structures to identify a camera index of the camera device facing the detected error; and resetting a camera function of the camera device according to the camera index in case the camera device index is matched with the unique name of the at least one camera device.

2. The method of claim 1, wherein the camera device comprises a Mobile Industry Processor Interface (MIPI) camera device.

3. The method of claim 1, wherein the preconfigured camera device identification details comprise the unique camera index, a camera handle (i2c handle) and sensor structure comprising camera sensor device handle, wherein the unique camera index is assigned according to a camera device tree entry and i2c bus address for the camera device.

4. The method of claim 1, comprising: initialising the error handling thread with the stream monitor array of one or more structures, wherein the initialization is a one-time initialization before invoking the error handling thread based on the detection of the error.

5. The method of claim 1, wherein the invoking the error handling thread comprises:

assigning a global variable to store the camera device index facing the error;

tracking, through a counter, a number of errors identified for the camera device, wherein a counter value for the counter is incremented in case of identification of each subsequent error, wherein the counter value is incremented till the counter value reaches a maximum permissible threshold value, wherein the number of errors comprise non-correctable errors;

storing the camera device index into the global variable;

setting a wait queue condition for handling the detected errors to 1; and invoking the error handling thread when the number of errors reaches the maximum permissible threshold value, wherein the counter value is reset to 0 after the invoking of the error handling thread.

6. The method of claim 5, wherein the wait queue condition comprises an active wait queue condition when value of the wait queue condition is set to 1 and wherein the wait queue condition comprises an inactive wait queue condition when value of the wait queue condition is set to 0.

7. The method of claim 5, wherein the invoking the error handling thread comprises:

identifying a camera device index of the camera device facing the error, wherein the camera device index is identified using the stream monitor array of structures;

determining whether to increment the counter for the identified camera device index;

defining the maximum permissible threshold value for the total number of errors for all camera device index facing the detected error; and invoking the error handling thread when the number of errors reaches the maximum permissible threshold value.

8. The method of claim 1, wherein the resetting the camera function comprises:

resetting an image signal processor (ISP) block or sensor blocks of the camera device, wherein the resetting ISP block comprises: reinitializing at least one of controls and resolution of streaming data with a previously configured streamed resolution and controls of previously streamed data, wherein the resetting the ISP block recovers the camera streaming during failures in the streaming process.

9. The method of claim 1, wherein the error handling thread switches to a sleep mode, on successful completion of the resetting of the camera function or wherein the error handling thread switches to an invoke state from the sleep state when the total number of errors reaches the maximum permissible value.

10. The method of claim 1, further comprising:

communicating, through the error handling thread to the platform, a cause of the error resulting in streaming failure of the camera device, if the streaming failure is not successfully recovered.

11. The method of claim 1, further comprising:

recovering the camera streaming during failures based on the resetting the camera function with the i2c client handle and sensor structure handle to reinitialize the camera device.

12. A system for recovering camera streaming during failures in streaming process of a camera device, the system comprising:

a processor;

a memory storing instructions executable by the processor;

a camera interface;

a camera driver probe operable on the processor to initialize a stream monitor array of one or more structures, wherein each structure in the stream monitor array is having preconfigured camera device identification details;

a platform operable on the processor, the platform configured to:

detect an error associated with the camera device during the streaming process through the camera device;

invoke an error handling thread upon detecting the error in the streaming process through the camera device;

compare a camera device index associated with the camera device facing the detected error to a unique camera index in the preconfigured camera device identification details of each camera in the stream monitor array of the one or more structures;

identify if the camera device index matches with the unique name of at least one camera device in the stream monitor array of the one or more structures to identify a camera index of the camera device facing the detected error; and reset a camera function of the camera device according to the camera index in case the device index is matched with the unique name of at least one camera device.

13. The system of claim 12, wherein the camera device comprises a Mobile Industry Processor Interface (MIPI) camera device.

14. The system of claim 12, wherein the preconfigured camera device identification details comprises the unique camera index, a camera handle (i2c handle) and sensor structure comprising camera sensor device handle, wherein the unique camera index is assigned according to a camera device tree entry and i2c bus address for the camera device.

15. The system of claim 12, wherein the platform is further configured to:

initialize the error handling thread with the stream monitor array of one or more structures, wherein the initialization is a one-time initialization before invoking the error handling thread based on the detection of the error.

16. The system of claim 12, wherein the platform is configured to invoke the error handling thread by:

assigning a global variable to store the camera device index facing the error;

tracking, through a counter, a number of errors identified for the camera device, wherein a counter value for the counter is incremented in case of identification of each subsequent error, wherein the counter value is incremented till the counter value reaches a maximum permissible threshold value, wherein the number of errors comprise non-correctable errors;

storing the camera device index into the global variable;

setting a wait queue condition for handling the detected errors to 1; and invoking the error handling thread when the number of errors reaches the maximum permissible threshold value, wherein the counter value is reset to 0 after the invoking of the error handling thread.

17. The system of claim 16, wherein the platform is configured to invoke the error handling thread by:

identifying a camera device index of the camera device facing the error, wherein the camera device index is identified using the stream monitor array of structures;

determining whether to increment the counter for the identified camera device index;

defining the maximum permissible threshold value for the total number of errors for all camera device index facing the detected error; and invoking the error handling thread when the number of errors reaches the maximum permissible threshold value.

18. The system of claim 12, wherein the platform is configured to reset the camera function by:

resetting an image signal processor (ISP) block or sensor blocks of the camera device, wherein the resetting ISP block comprises: reinitializing at least one of controls and resolution of streaming data with a previously configured streamed resolution and controls of previously streamed data, wherein the resetting the ISP block recovers the camera streaming during failures.

19. The system of claim 12, wherein the error handling thread switches to a sleep mode, on successful completion of the resetting of the camera function or wherein the error handling thread switches to an invoke state from the sleep state when the total number of errors reaches the maximum permissible value.

20. The system of claim 12, wherein the platform is further configured to:

recover the camera streaming during failures based on the resetting the camera function with the i2c client handle and sensor structure handle to reinitialize the camera device.

* * * * *